W. BLAIR.
COASTER HUB FOR VELOCIPEDES AND THE LIKE.
APPLICATION FILED FEB. 4, 1911.
1,004,138.
Patented Sept. 26, 1911.
4 SHEETS—SHEET 1.
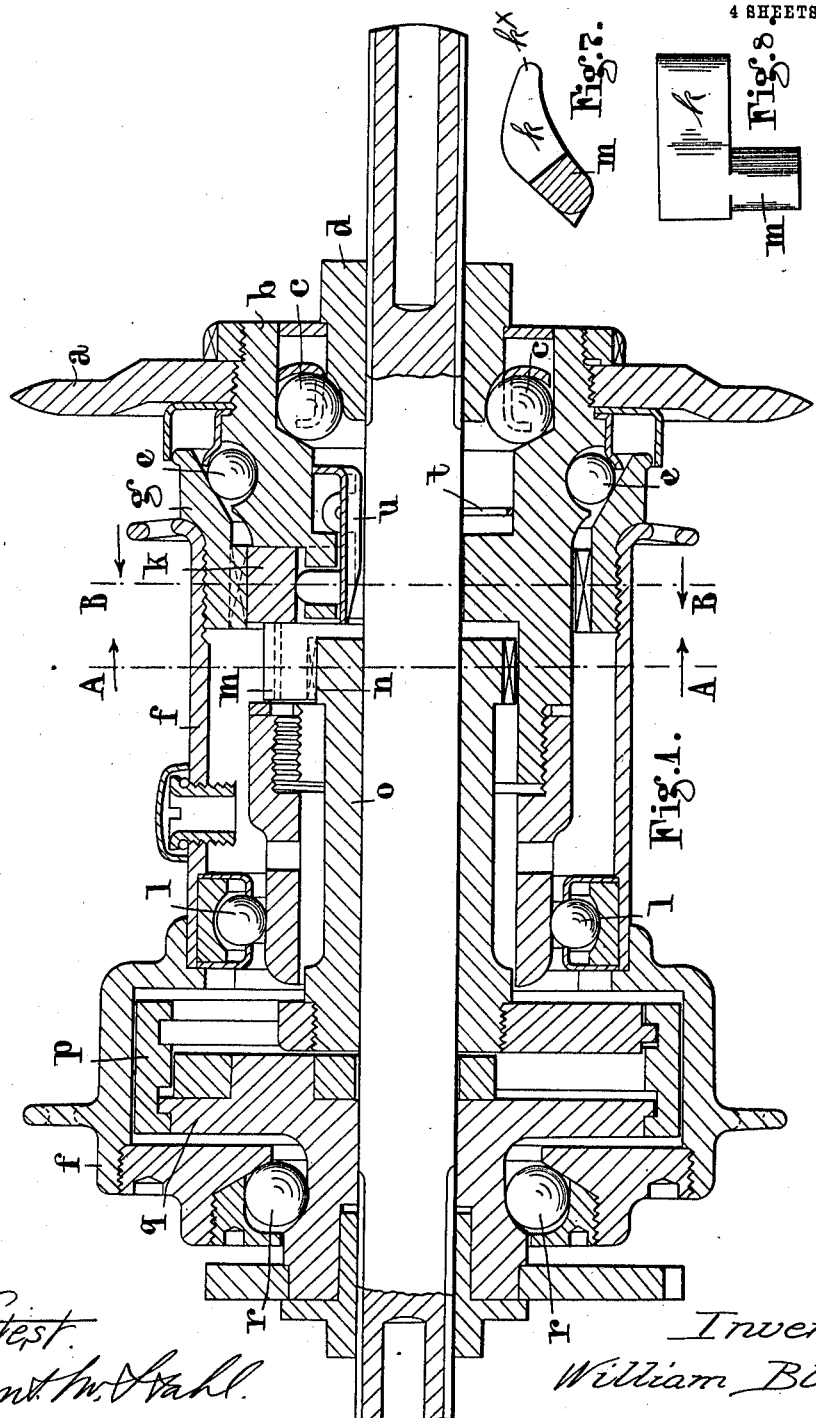

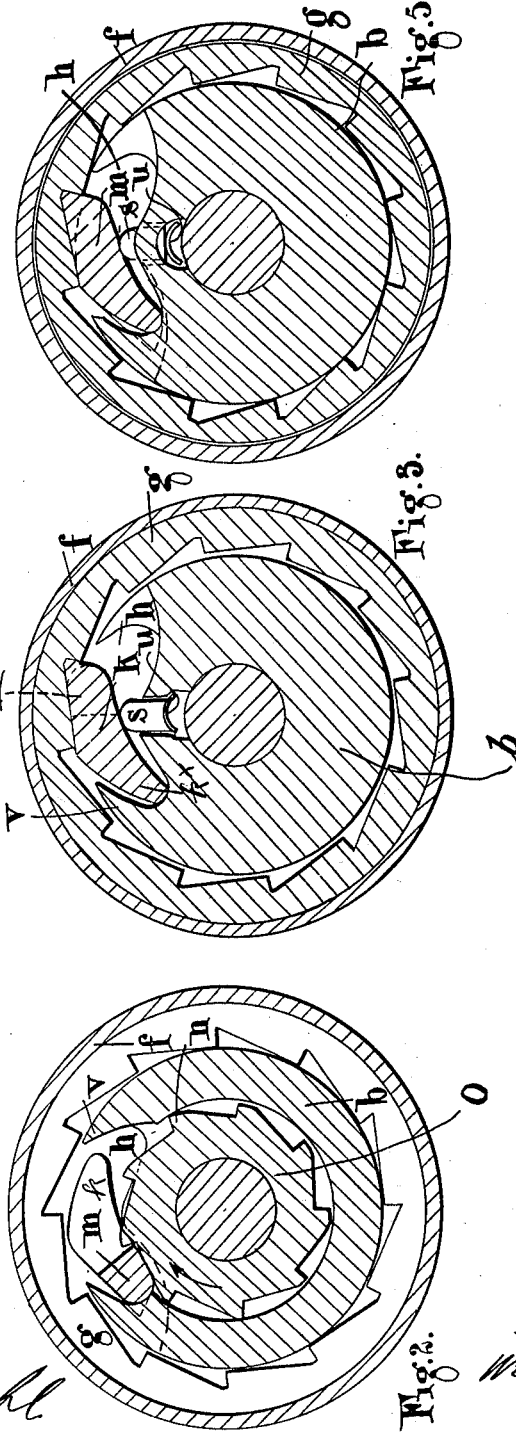

W. BLAIR.
COASTER HUB FOR VELOCIPEDES AND THE LIKE.
APPLICATION FILED FEB. 4, 1911.
1,004,138.
Patented Sept. 26, 1911.
4 SHEETS—SHEET 3.
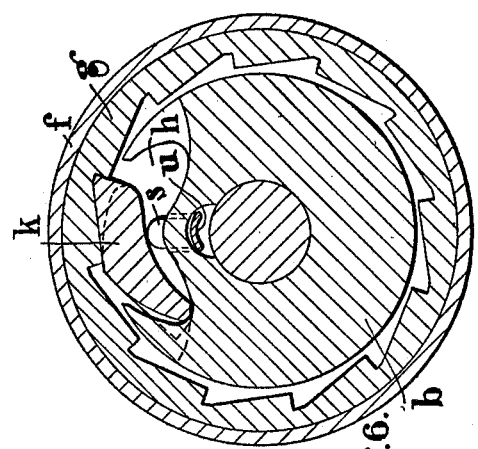
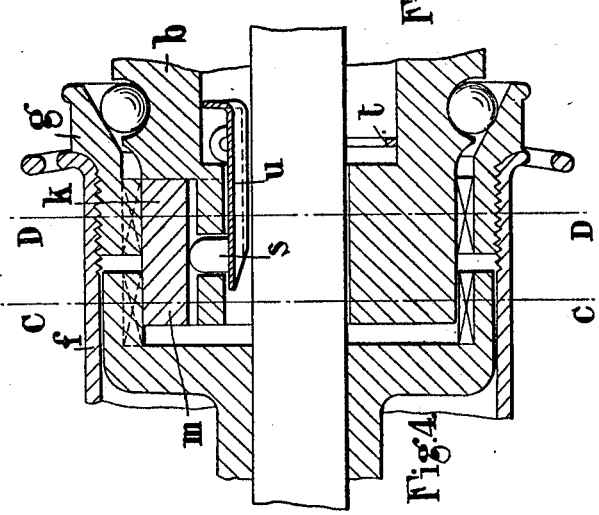
Attest.
Bent. M. Stahl.
Edward N. Saxton
Inventor.
William Blair
by Spear, Middleton, Donaldson & Spear
Attys.

W. BLAIR.
COASTER HUB FOR VELOCIPEDES AND THE LIKE.
APPLICATION FILED FEB. 4, 1911.
1,004,138.
Patented Sept. 26, 1911.
4 SHEETS—SHEET 4.
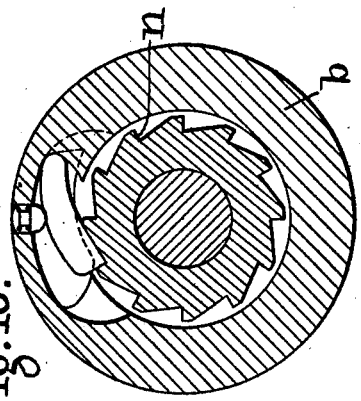
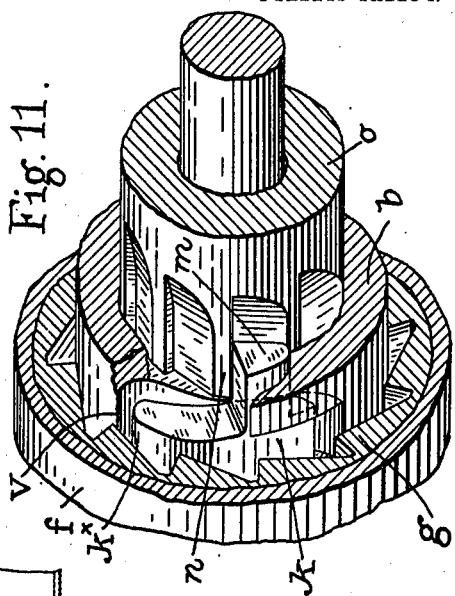
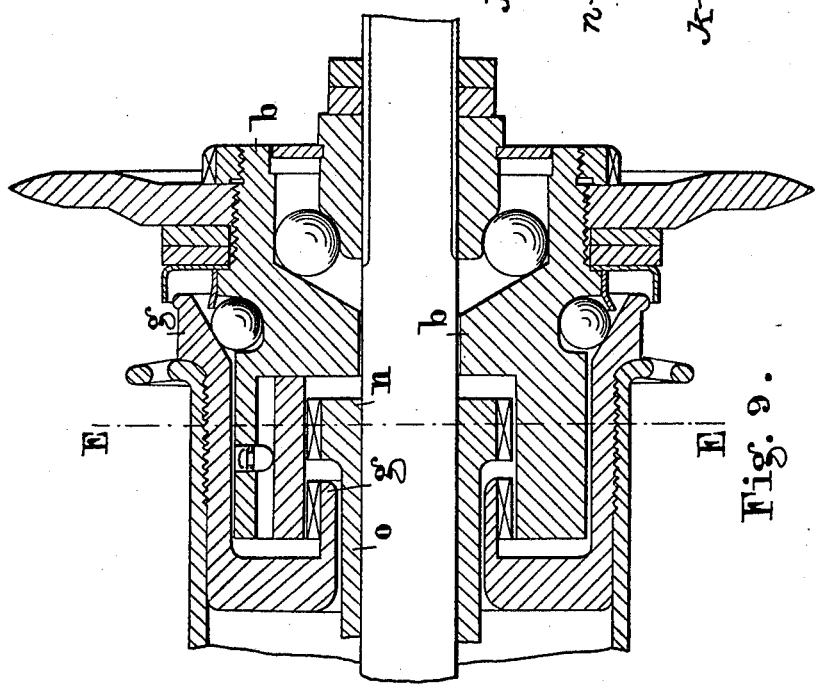
Attest.
Bent. M. Stahl.
Edward N. Saxton
Inventor
William Blair
By Spear, Middleton, Donaldson & Spear
Attys

UNITED STATES PATENT OFFICE.

WILLIAM BLAIR, OF COVENTRY, ENGLAND, ASSIGNOR TO RUDGE-WHITWORTH LIMITED, OF COVENTRY, ENGLAND.

COASTER-HUB FOR VELOCIPEDES AND THE LIKE.

1,004,138.     Specification of Letters Patent.     Patented Sept. 26, 1911.

Application filed February 4, 1911. Serial No. 606,639.

*To all whom it may concern:*

Be it known that I, WILLIAM BLAIR, subject of the King of Great Britain and Ireland, residing at Rudge Works, Coventry, in the county of Warwick, England, have invented certain new and useful Improvements in and Relating to Coaster-Hubs for Velocipedes and the Like, of which the following is a specification.

This invention relates to improvements in coaster hubs for velocipedes and the like of the type in which one or more floating double-acting pawls are mounted in one or more recesses in and used to engage the driving member with either the hub shell or the braking ratchet teeth as required, its object being to provide a coaster hub of the above type which shall be simple in its construction and efficient in its action.

The invention consists in a coaster hub for velocipedes and the like, in which the movement of the pawl from one to the other of its engaging positions is effected by the contour of the recess in the driving member wherein it lies, which contour is such that on a small circumferential movement of the pawl within this recess, a point thereof is suitably elevated or depressed to effect the desired engagement, the circumferential movement being caused by spring produced friction of the pawl with an opposing part.

This invention also consists in the improved form of pawl actuation for coaster hubs as hereinafter described.

Referring now to the accompanying drawings, Figure 1 shows in cross section one form of hub according to the present invention. Figs. 2 and 3 are cross sections on A—A and B—B respectively of Fig. 1. Fig. 4 shows another form of the hub, in which the pawl engages in one of two internal ratchet rings. Figs. 5 and 6 are cross sectional elevations on the lines C—C and D—D respectively of Fig. 4. Figs. 7 and 8 are elevation and plan respectively of the pawl used in the modification shown in Figs. 1, 2 and 3. Fig. 9 shows a form of the hub in which the pawl engages with one of two external ratchet rings. Fig. 10 is a cross section on the line E—E of Fig. 9 with shell $g$ omitted. Fig. 11 is a perspective view with parts broken away.

In carrying the invention into effect as shown for example in Figs. 1, 2 and 3 of the drawings, the chain sprocket wheel, $a$, is mounted on a driving member, $b$, running on ball bearings, $c$, placed between itself and an adjustable cone, $d$, carried on the hub spindle. On the other side ball bearings, $e$, separate the member from the outer hub shell, $f$, and from a member, $g$, attached thereto and provided with internal ratchet teeth as shown in Figs. 2 and 3. At a suitable position on the circumference of the driving member, $b$, there is formed a recess, $h$, in which is placed a double-acting pawl, the sides of the recess being formed to prevent side movement of the pawl. This pawl consists of two parts, $k$, and $m$, the part $k$, being of a shape commonly used in freewheel devices, and the part, $m$, being in the form of a thick arm projecting therefrom. The two parts are formed integral with one another and placed side by side but with their noses pointing in opposite directions, one projecting upward and the other downward. It has been found preferable to make the part, $m$, of the pawl with a length equal to about one third that of the part, $k$.

The opposite ends of the recess, $h$, are cut away in such a manner that when the tail end $k^x$ of one half, $k$, of the pawl is in engagement with its end of the recess, the projecting nose of the other half, $m$, is completely freed from ratchet teeth, $n$, formed externally on a member, $o$, by which the operation of the brake is effected. The form of the brake is immaterial, but by way of example the brake actuating member, $o$, is shown connected to a brake of the type in which a copper or like band, $p$, suitably guided in a stationary member, $q$, secured to a cycle or like frame, is caused to expand and come into contact with the hub shell, $f$, which under ordinary conditions runs on ball bearings, $r$, placed between itself and the member, $q$. It will be seen that the hub shell, $f$, thus is substantially connected with and is under the entire control of the sprocket wheel, $a$, in consequence of the braking effect.

In order to maintain the pawl in a position ready for engagement with either of the members, $g$, or $n$, by means of the ratchet teeth thereon, suitable spring means are placed under the pawl. Such means may consist as shown of a round headed peg, $s$, carried in a hole in the driving member, $b$, and pressed into contact with the underside of the pawl by a spring—say of the type comprising a piece of coiled wire, $t$, placed in a recess in the driving member, $b$, and operating through the medium of the member, $u$. The tilting of the pawl is effected and clattering over the ratchet teeth in free-wheeling is avoided in the following manner:—The pawl recess, $h$, is formed with a pocket at each end so that when a relative movement takes place between the driving member, $b$, and the part, $k$, of the pawl and the tail of the part $k$, is coming into engagement with its corresponding end of the recess, the part $v$, of the driving member, $b$, is arranged to insert itself between the pawl and the internal ratchet ring, on the member, $g$, and as the pawl moves down into its pocket, the spring-pressed peg, $s$, which is centrally placed in the recess presses the free end outward and so effectually tilts the pawl.

Although this invention has been described as applied to the case in which the pawl engages with internal and external ratchet rings, it is equally applicable to the case in which two internal or two external ratchet rings of the same or different diameter are used, suitable modifications being made in the manner of carrying the invention into effect for the purpose and the two noses of the pawl being suitably turned so as to engage the ratchet rings.

An example of a hub having two internal ratchet rings is shown in Figs. 4, 5 and 6 in which parts similar to the first modification have been correspondingly indicated. In such a hub the ratchet rings on both the driven and brake actuating members, $g$ and $o$, are of the internal type and substantially of the same diameter, the driving member, $b$, which carries the chain wheel, $a$, being formed with a part having a diameter only slightly less than the internal diameter of the two ratchet rings. As before a recess, $h$, is formed in the driving member and a double acting pawl each part of which is of shape commonly used in free-wheel devices placed therein. The shape of the driving side of the pawl is similar to that described in the first modification, but the nose of the braking pawl $m$, instead of pointing downward, points upward, and preferably slightly beyond the tail of the driving part. The curve of the back of the pawl from one nose to the other and the spacing of the teeth on the driving and braking ratchet rings is in such relation to the length of the pawl that only one of the noses of the pawl can be in engagement with one of the ratchet rings at any instant.

In the form in which two external ratchet rings are employed, as shown in Figs. 9 and 10, the driving member, $b$, is formed with a hollow cylindrical extension embracing both sets of ratchet teeth, the pawl being carried in a recess in the internal surface of this extension, the member, $g$, connected to the hub shell is brought around so that the ring of teeth formed thereon is on the left hand side, and the member, $o$, which operates the brake is carried through the end of the member, $g$, so that the ring of teeth, $n$, come upon the right hand side of those previously mentioned.

With the actuating device above described one pawl is, as a rule, only necessary and, as it is not pivoted in any manner, the danger of breakage is materially reduced. The shape of the recess in the driving member is such that the pawl bears against a part of the driving member as near as possible directly behind the engaging nose of the pawl.

This form of coaster hub can be used in conjunction with certain forms of variable speed gear to form a connection in one hub between a speed gear and a coaster brake.

In all the modifications of the invention the shape of the pawl and the recess in which it is placed are capable of considerable modification and also many modifications can be made in the general construction of the pawl actuation device without in any way departing from the spirit of the invention.

The device operates as follows:—When the driving member $b$, is held stationary while the ratchet ring on the shell member $g$ continues running, friction will act on the pawl to carry it to the other end of the recess in the driving member and throw it into the pocket. In this position the pawl is ready to engage with the braking ratchet ring when the driving member is backwardly rotated and by a slight backward pressure in said driving member, which pressure is not sufficient to apply the brake, the pawl is kept completely free of the driving ratchet ring and is held down in the recess thus avoiding all clattering, but when the pawl is in position for engaging with the brake actuating member $o$, the part $m$ of the pawl is in the relative position shown in Fig. 2. Assuming that the driving member $b$ has been rotated in a forward direction, the nose of one half $k$ of the pawl will be in engagement with the ratchet ring on the member $g$, as shown in Fig. 3, while the tail of the same half of the pawl is pressed into the pocket at the other end of the recess $h$, in the driving member $b$. So long as the driving member rotates in this direction its motion will be transmitted to the hub shell $f$, and no change in the position of the pawl will take place. Should, however, the driving member $b$ be held still—as in free-wheeling—the ratchet ring carried by the shell hub $f$ will continue revolving and by friction will carry the pawl to the other end of the recess $h$, in the driving member. During this movement of the pawl relative to the driving member b, the nose of the part k, of the pawl that was in engagement with the driving ratchet ring is turned inward, while the other nose is pressed downward against the breaking ratchet ring, the corresponding tail of the pawl then seating in the pocket at the other end of the recess.

Having now described my invention, what I claim as new and desire to secure by Letters Patent is:—

1. In combination in a coaster hub for velocipedes and the like, a hub shell, ratchet teeth carried by the hub shell, a brake actuating member within the hub shell, ratchet teeth upon said brake actuating member, a driving member extending into the hub shell, a double acting pawl carried in a recess in said driving member, and means acting to move said pawl circumferentially in said recess to effect engagement with the teeth of the hub shell or of said brake actuating member.

2. In combination in coaster hubs for velocipedes and the like, a hub shell, a brake actuating member, teeth carried by said shell and member, a driving member extending into the hub, a pocket having cam shaped ends formed in said driving member, a double acting pawl capable of circumferential movement in said pocket, said movement causing said pawl to engage with the teeth carried by the hub shell or the brake actuating member, and means acting to cause said circumferential movement of said pawl.

3. In combination in a coaster hub for velocipedes and the like, a hub shell, a brake actuating member, teeth carried by said hub and member, a driving member extending into the hub, a pocket having cam shaped ends formed in said driving member, a double acting pawl capable of circumferential movement in said pocket, and spring means causing friction of said pawl with one of the sets of teeth, whereby said pawl is moved circumferentially in said pocket and co-acts with the ends thereof to engage the teeth carried by the hub shell or the brake actuating member.

4. In combination in coaster hubs for velocipedes and the like, a brake actuating member, a ring of ratchet teeth formed upon said actuating member, a hub shell, a ring of ratchet teeth fixed within the hub shell, a driving member extending into the hub, a pocket having cam shaped ends formed in said driving member, a double acting pawl capable of circumferential movement in said pocket, and co-acting with the cam shaped ends thereof to engage one or other of said rings of ratchet teeth and a spring pressing said pawl into frictional engagement with the teeth fixed to said hub shell to effect movement of said pawl to one or the other end of said pocket.

5. In combination in coaster hubs for velocipedes and the like, a brake actuating member, a ring of internal ratchet teeth formed upon said actuating member, a hub shell, a ring of internal ratchet teeth fixed within the hub shell, a driving member extending into the hub, a pocket having cam shaped ends formed in said driving member, a double acting pawl capable of circumferential movement in said pocket, and co-acting with the cam shaped ends thereof to engage one or other of said rings of ratchet teeth and a spring pressing said pawl into frictional engagement with the rings of ratchet teeth to effect movement of said pawl to one or the other end of said pocket.

In testimony whereof I have signed my name to this specification in the presence of two subscribing witnesses.

WILLIAM BLAIR.

Witnesses:
W. A. BAKER,
J. NEWTON.

---

Copies of this patent may be obtained for five cents each, by addressing the "Commissioner of Patents, Washington, D. C."